Patented Sept. 7, 1948

2,448,767

UNITED STATES PATENT OFFICE 2,448,767

PROCESS OF HYDROXYETHYLATION

Warner W. Carlson, Pittsburgh, Pa., assignor to Mellon Institute of Industrial Research, Pittsburgh, Pa., a corporation of Pennsylvania No Drawing. Application December 5, 1942, Serial No. 467,991

14 Claims. (Cl. 260—284)

This invention lies in the discovery of a new process of reaction, whereby the hydroxyethyl group may be introduced into certain organic compounds, and, specifically, into phenols, thiophenols, amines, the alcohols, the thioalcohols, and the carboxylic acids. The discovery is that these substances may, under suitable conditions, be reacted with a substance of a group that consists of ethylene carbonate and ethylene sulfite, and hydroxyethylation effected.

Reaction with phenols and thiophenols is indicated in the following equations—

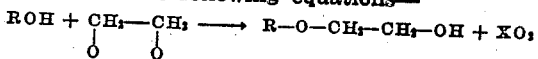

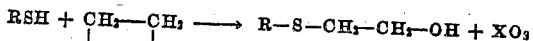

In the foregoing equations R represents an aromatic or a heterocyclic nucleus, and X represents a carbon or a sulfur atom. In the case of ethylene carbonate, X=C; in the case of ethylene sulfite, X=S.

The conditions of reaction may vary within rather wide limits, depending upon such factors as the stability and the chemical make-up of the phenol or thiophenol to be hydroxyethylated. The reaction may be carried out in the absence of a catalyst, or in the presence of an acidic catalyst such as concentrated sulfuric acid or an alkyl ester of sulfuric acid, such as di-methyl sulfate, or in the presence of an alkali carbonate, or with an alkali salt of the phenol. In addition, dependent upon the conditions chosen, the reaction may be carried out either in the presence or in the absence of a suitable solvent. In general, the most useful procedure involves heating the phenol with ethylene carbonate (or sulfite) in the presence of an alkali carbonate, such as potassium carbonate, with either an excess of the hydroxyethylating agent or with a neutral material, such as benzene, serving as the solvent. Under such conditions a temperature of 80°–100° C. and a time of reaction of 1 hour usually suffice to afford a high yield of the desired product.

In the absence of a catalyst, or in the presence of an acidic catalyst, the phenol and the hydroxyethylating agent are heated together to a temperature at which rapid evolution of $CO_2$ (or $SO_2$) takes place. With a variety of phenols, this temperature was found to vary from 110° to 200° C. Under these conditions reaction of phenols and thiophenols with ethylene sulfite was found to be less satisfactory than with ethylene carbonate. Further, the reaction of the phenols with either of the two hydroxyethylating agents in the absence of a catalyst, or in the presence of an acidic catalyst, results in the formation of by-products, as well as the desired ethers; and it is mainly for this reason that reaction in the presence of an alkali carbonate (or with an alkali salt of the phenol as the starting material) is preferred. So proceeding, the quantity of by-product in the yield is negligible.

A special advantage of ethylene carbonate as the hydroxyethylating agent is the ability to react with nitrogen-containing phenols, to give high yield with very little by-product formation. The reaction of ethylene sulfite with nitrogen-containing phenols is less satisfactory, in that the tendency to the formation of by-products is more pronounced.

In Letters Patent of the United States, 2,172,607, granted September 12, 1939, a process is described by which hydroxyethyl ethers may be derived from phenolic hydroxyl-group-containing cinchona alkaloids. The process involves (1) the alkylation of the starting material with benzyl-oxyalkyl aromatic sulfonates, with the production of benzyl oxyalkyl ethers of the cinchona alkaloids, and (2) hydrolyzing these intermediate benzyl oxyalkyl ethers in dilute mineral acid to yield the desired hydroxyethyl ethers. The starting materials of the patent named, phenolic hydroxyl-group-containing cinchona alkaloids, are phenols, within my contemplation. They may be reacted with either of the reagents specified, ethylene carbonate or ethylene sulfite, with the production in a single and simple step of procedure of the desired end products, the hydroxyethyl ethers.

I have in the course of the foregoing discussion named phenol itself, thiophenol, alkaline salts of phenol and certain phenolic compounds. To these I may add β-naphthol, 8-hydroxyquinoline, all of which are responsive to the process of my invention. I have tested all available phenolic compounds, and have found all to be responsive in the manner described; and I believe there is none that is not so responsive.

Following are examples of the reaction of phenols and thiophenols—

Example 1

0.1 mole of the potassium salt of β-naphthol and 0.2 mole of ethylene sulfite, in the presence of benzene, were heated with stirring to 83°–85° C. for 1 hour. The yield of hydroxyethyl β-naphthol was 93% of the theoretical yield.

Example 2

0.1 mole of the sodium salt of β-naphthol and 0.2 mole of ethylene carbonate, in the presence of toluene, were heated with stirring for 1 hour on the steam bath. The yield was 86% of theoretical value, with the recovery of 8% of unused β-naphthol.

*Example 3*

0.05 mole of β-naphthol, 0.08 mole of potassium carbonate, and 0.25 mole of ethylene carbonate were heated with stirring for 1 hour at 88°–90° C. The actual yield was 93% of the theoretical.

*Example 4*

0.2 mole of β-naphthol and 0.4 mole of ethylene carbonate were heated at 190°–195° C. for 1 hour, the theoretical amount of $CO_2$ being lost in this interval of time. The yield of crude β-hydroxyethyl β-naphthol was 100%.

*Example 5*

0.3 mole of thiophenol, 0.3 mole of potassium carbonate, 0.06 mole of ethylene carbonate, and 50 cc. of benzene were warmed on the steam bath with stirring for 1 hour. The yield of crude product was 100%.

*Example 6*

0.03 mole of the sodium salt of apocupreine and 0.6 mole of ethylene carbonate were heated with stirring at 100° C. for 1 hour. The actual yield of hydroxyethyl apocupreine was 76% of the theoretical.

*Example 7*

0.03 mole of apocupreine, 0.09 mole of potassium carbonate, and 0.6 mole of ethylene carbonate were heated with stirring at 100° C. for 1 hour. The yield was 89% of theory.

*Example 8*

0.03 mole of apocupreine, 0.09 mole of potassium carbonate, 0.3 mole of dimethyl-ethyl carbinol, and 0.3 mole of ethylene carbonate were heated with stirring for 1 hour at 100° C. The yield was 88% of theory.

*Example 9*

0.03 mole of 8-hydroxyquinoline, 0.3 mole of ethylene carbonate, and 0.03 mole of potassium carbonate were heated at 95° for 1 hour. The yield was 77% of theory.

The reaction of ethylene carbonate and ethylene sulfite with the amines is indicated in the following equation—

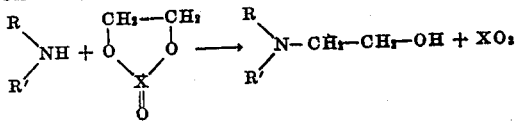

In this equation X, as before, represents an atom either of carbon or of sulfur; R represents an aliphatic, an araliphatic, an aromatic, or a heterocyclic nucleus, and R' represents any of these radicals or a hydrogen atom.

In general, the reaction is carried out by heating the amine with ethylene carbonate (or ethylene sulfite) to the temperature at which active evolution of $CO_2$ (or $SO_2$) occurs. A solvent may, or may not, be used. In addition, the reaction may be carried out in the presence of an alkaline catalyst, such as an alkali carbonate. The class of amines includes aniline, cyclo-hexyl amine, anisidine, etc. I have found the process of the invention effective upon all available amines; and I believe there is none upon which it will not be found to be effective.

Following are examples of the reaction of amines—

*Example 1*

1.1 moles of ethylene carbonate and 1.0 mole of aniline were heated for 0.5 hour at 160° C. and then for 2 hours at 190°. By fractional distillation there was obtained a yield of monohydroxyethyl aniline of 51% and of di-hydroxyethyl aniline of 17%.

*Example 2*

0.5 mole of ethylene sulfite and 0.5 mole of aniline were heated at 120° C. for 1–5 hours. By fractional distillation there was obtained a yield of mono-hydroxyethyl aniline of 48% and of di-hydroxyethyl aniline of 10%.

The reaction of the invention upon alcohols and thioalcohols is represented in the following equations—

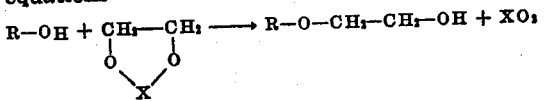

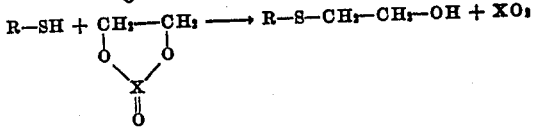

In these equations X has the same significance as before (C or S), and R represents an aliphatic or an araliphatic grouping.

The reaction may be carried out in either of several ways. (a) The starting material may be heated with ethylene carbonate (or sulfite) in the absence of a catalyst, or in the presence of an acidic catalyst, such as concentrated sulfuric acid or an alkyl ester of sulfuric acid, for example, dimethyl sulfate, to the temperature at which active evolution of $CO_2$ (or $SO_2$) occurs. This procedure is acceptable for the reaction of alcohols and thioalcohols with ethylene carbonate, or for the reaction of alcohols with ethylene sulfite. The thioalcohols are best reacted with ethylene carbonate, for in such case there is not much tendency toward by-product formation. (b) The starting material may be heated with ethylene carbonate (or sulfite) in the presence of such a basic material as an alkali carbonate, or an alkali salt of the alcohol or thioalcohol may be heated with the reagent, either in the presence or in the absence of a solvent. The reaction of a thioalcohol in the presence of an alkali carbonate proceeds smoothly; it is less satisfactory in the case of the alcohols. The reaction of alkali salts of alcohols and thioalcohols is best carried out in the presence of a neutral solvent, such as benzene.

The process of the invention is applicable to benzyl alcohol, butyl alcohol, benzyl thioalcohol, thioglycol, etc.

Following are examples of reaction with alcohols and thioalcohols—

*Example 1*

0.5 mole of ethylene sulfite and 1.5 moles of benzyl alcohol were heated at 140° C. for 0.75 hour. By fractional distillation there was obtained a yield of benzyloxyethanol of 32% of theory.

*Example 2*

1 mole of ethylene carbonate and 1 mole of monothyoglycol were heated at 120°–125° C. for 2 hours. The yield of crude bis-β-hydroxyethyl sulfide was 92% of theory.

Example 3

0.25 mole of ethylene carbonate, 0.75 mole of butyl alcohol, and several drops of di-methyl sulfate were heated at 130° C. for 2 hours. On fractional distillation there was obtained a yield of butoxyethanol of 27% of theory.

Example 4

To 0.7 mole of butyl alcohol (52 gm.) and 75 cc. of benzene were added 11.5 gms. (0.5 mole) of metallic sodium. The mixture was heated at 100° C. until all the sodium had dissolved, after which 0.5 mole (44 gm.) of ethylene carbonate was added, and the heating continued for 0.5 hour. From the reaction mixture was obtained a yield of beta-butoxyethanol (butyl Cellosolve) of 38% of theory.

The reaction of ethylene carbonate and ethylene sulfite with carboxylic acids is represented by the equation—

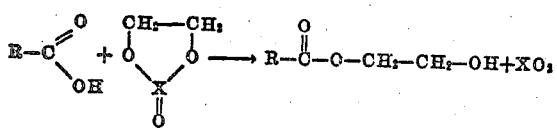

As before, X stands for C or S, and R stands for an aliphatic, an araliphatic, an aromatic, or a heterocyclic nucleus.

The reaction is carried out most conveniently by heating the carboxylic acid with the reagent, either in the absence of a catalyst, or in the presence of an acidic catalyst, such as concentrated sulfuric acid, to the temperature at which active evolution of $CO_2$ (or $SO_2$) occurs. The carboxylic acids are exemplified in acetic acid, benzoic acid, paranitro benzoic acid, etc.

The following is an example of the reaction with carboxylic acids.

0.5 mole of ethylene sulfite, 0.5 mole of glacial acetic acid, and 3 drops of concentrated $H_2SO_4$ were heated at 85°–95° C. for 1–5 hours. By fractional distillation there was obtained a yield of glycol monoacetate of 73% of theory.

And in all these cases the end product is the hydroxyethyl ester.

I claim as my invention:

1. The method of introducing the hydroxyethyl radical into a substance of the group that consists of the phenols, the mercaptans, amines containing reactive hydrogen, the alcohols, and the carboxylic acids, which consists in reacting such substance with an ethylene ester of a group that consists of ethylene carbonate and ethylene sulfite.

2. The method of producing the hydroxyethyl ether of a phenol, which consists in reacting such member with an ethylene ester of a group that consists of ethylene carbonate and ethylene sulfite.

3. The method of producing a hydroxyethyl ether, which consists in reacting a phenolic hydroxyl-group-containing cinchona alkaloid with an ethylene salt of a group that consists of ethylene carbonate and ethylene sulfite.

4. The method of producing an hydroxyethyl ether, which consists in reacting apocupreine with an ethylene salt of a group that consists of ethylene carbonate and ethylene sulfite.

5. The method of producing an hydroxyethyl ether, which consists in reacting apocupreine with ethylene carbonate in the presence of an alkali carbonate as a condensing agent.

6. The process of hydroxyethylation of phenols, which comprises reacting a phenol with an ethylene ester selected from the group consisting of ethylene carbonate and ethylene sulphite by heating the phenol and ester to a reacting temperature of at least 80° C. in the presence of a condensing agent.

7. The process of hydroxyethylation of phenols, which comprises reacting a phenol with an ethylene ester selected from the group consisting of ethylene carbonate and ethylene sulphite by heating the phenol and ester to a reacting temperature between substantially 110° C. and substantially 200° C. in the presence of an acidic condensing agent.

8. The process of hydroxyethylation of phenols, which comprises reacting a phenol with an ethylene ester selected from the group consisting of ethylene carbonate and ethylene sulphite by heating the phenol and ester to a reaction temperature between substantially 80° C. to substantially 110° C. in the presence of an alkaline condensing agent.

9. The process of producing a hydroxyethyl ether from a phenolic hydroxyl group-containing cinchona alkaloid, which comprises reacting the alkaloid with an ethylene ester selected from the group consisting of ethylene carbonate and ethylene sulphite by heating the alkaloid and ester to a reaction temperature of at least 80° C.

10. The process of producing a hydroxyethyl ether from a phenolic hydroxyl group-containing cinchona alkaloid, which comprises reacting the alkaloid with an ethylene ester selected from the group consisting of ethylene carbonate and ethylene sulphite by dissolving the alkaloid in an excess of the ester containing a condensing agent, and heating the resulting solution at a reaction temperature of at least 80° C. for substantially an hour.

11. The process of producing a hydroxyethyl ether from a phenolic hydroxyl group-containing cinchona alkaloid, which comprises reacting the alkaloid with an ethylene ester selected from the group consisting of ethylene carbonate and ethylene sulphite by dissolving the alkaloid in an excess of the ester containing an alkaline condensing agent, and heating the resulting solution to a reacting temperature between substantially 80° and substantially 100° C., for substantially one hour.

12. The process of producing a hydroxyethyl ether, which consists in reacting beta-naphthol with an ethylene ester selected from the group consisting of ethylene carbonate and ethylene sulphite, by heating together the beta-naphthol and the ester to a temperature of from substantially 110° C. to substantially 200° C. and continuing the heating until completion of evolution of the theoretical amount of the inorganic dioxide by-product resulting from the said reaction.

13. The process of producing a hydroxyethyl ether, which consists in reacting beta-naphthol with an ethylene ester selected from the group consisting of ethylene carbonate and ethylene sulphite, by heating together the beta-naphthol and the ester in the presence of an acidic condensing agent, to a temperature of from substantially 110° C. to substantially 200° C., and continuing the heating until completion of evolution of the theoretical amount of the inorganic dioxide by-product resulting from the reaction.

14. The process of producing a hydroxyethyl ether, which comprises reacting 8-hydroxyquinoline with an ethylene ester of the group consisting of ethylene carbonate and ethylene sulphite, by heating together the 8-hydroxyquinoline and the ester at a temperature of from substantially 80° C. to substantially 100° C. for a period of approximately one hour.

WARNER W. CARLSON.

REFERENCES CITED

The following references are of record in the file of this patent:

UNITED STATES PATENTS

| Number | Name | Date |
|---|---|---|
| 1,817,425 | Steimmig et al. | Aug. 4, 1931 |
| 1,882,808 | Graves | Oct. 18, 1932 |
| 1,907,831 | Steimmig et al. | May 9, 1933 |
| 1,976,677 | Wittiver | Oct. 9, 1934 |
| 2,033,679 | Butler et al. | Mar. 10, 1936 |
| 2,051,486 | Kautter | Aug. 18, 1936 |

FOREIGN PATENTS

| Number | Country | Date |
|---|---|---|
| 696,774 | Germany | Sept. 28, 1940 |